(12) United States Patent
Zhang

(10) Patent No.: US 11,798,184 B2
(45) Date of Patent: *Oct. 24, 2023

(54) THREE-DIMENSIONAL IMAGE DEVICE

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,337

(22) Filed: Aug. 4, 2022

(65) Prior Publication Data
US 2022/0383528 A1 Dec. 1, 2022

Related U.S. Application Data

(63) Continuation of application No. 16/989,401, filed on Aug. 10, 2020, now Pat. No. 11,423,557, which is a continuation of application No. PCT/CN2019/075382, filed on Feb. 18, 2019.

(30) Foreign Application Priority Data

Jun. 28, 2018 (CN) .......................... 201810689572.3
Jun. 28, 2018 (CN) .......................... 201810690795.1

(51) Int. Cl.
*G06T 7/55* (2017.01)
*G06T 7/521* (2017.01)
*G01S 17/894* (2020.01)
*G01S 17/87* (2020.01)
*G01L 1/20* (2006.01)

(52) U.S. Cl.
CPC .............. *G06T 7/521* (2017.01); *G01S 17/87* (2013.01); *G01S 17/894* (2020.01); *G06T 7/55* (2017.01); *G01L 1/20* (2013.01); *G06T 2207/10028* (2013.01)

(58) Field of Classification Search
CPC ......... G06T 7/521; G06T 7/55; G01S 17/894; G01S 17/87
USPC ......................................................... 348/136
See application file for complete search history.

(56) References Cited

U.S. PATENT DOCUMENTS 11,423,557 B2 * 8/2022 Zhang ................... G01S 17/894
2016/0119552 A1 * 4/2016 Oh ..................... H04M 1/72403
348/333.06

* cited by examiner

*Primary Examiner* — Nguyen T Truong
(74) *Attorney, Agent, or Firm* — Young Basile Hanlon & MacFarlane, P.C.

(57) ABSTRACT

A three-dimensional image device is provided. The three-dimensional image device includes a depth processor, a structured-light depth camera, and a TOF depth camera. The depth processor includes at least two input ports configured to receive first images, an input switch coupled to the at least two input ports, and a data processing engine coupled to the input switch. The at least two input ports include a first input port and a second input port, the first input port is coupled to the structured-light depth camera, and the second input port is coupled to the TOF depth camera.

20 Claims, 11 Drawing Sheets

THREE-DIMENSIONAL IMAGE DEVICE

CROSS-REFERENCE TO RELATED APPLICATION(S)

This application is a continuation of U.S. patent application Ser. No. 16/989,401, filed on Aug. 10, 2020, which is a continuation application of International Application No. PCT/CN2019/075382, filed on Feb. 18, 2019, which claims priority and rights to Chinese Patent Application Nos. 201810689572.3 and 201810690795.1, both filed on Jun. 28, 2018, the entire contents of all of which are incorporated herein by reference.

TECHNICAL FIELD

The present disclosure relates to a field of image processing technologies, and more particularly to a three-dimensional image device.

BACKGROUND

A depth camera may obtain depth information of each object in a scene. An image collected by the depth camera is usually processed by a specific processor. Moreover, in different devices and application scenes, requirements for performance of the depth camera may also be different. Therefore, the special processor may also be usually customized based on a detailed application, which causes low integration and single function of the special processor.

SUMMARY

A three-dimensional image device is provided. The three-dimensional image device includes a depth processor, a structured-light depth camera, and a TOF depth camera. The structured-light depth camera includes a structured-light projector and a structured-light image collector, and the structured-light image collector is configured to collect a structured-light image in a target space projected by the structured-light projector. The TOF depth camera includes a TOF projector and a TOF image collector, and the TOF image collector is configured to receive an infrared light projected to a target space by the TOF projector and reflected by an object in the target space. The depth processor includes at least two input ports configured to receive first images, an input switch coupled to the at least two input ports, and a data processing engine coupled to the input switch. The at least two input ports include a first input port and a second input port, the first input port is coupled to the structured-light depth camera, and the second input port is coupled to the TOF depth camera.

BRIEF DESCRIPTION OF DRAWINGS

The above and/or additional aspects and advantages of the present disclosure will become more apparent and be understood more easily with reference to accompanying drawings and descriptions for implementations, in which.

DETAILED DESCRIPTION

Figure 1:
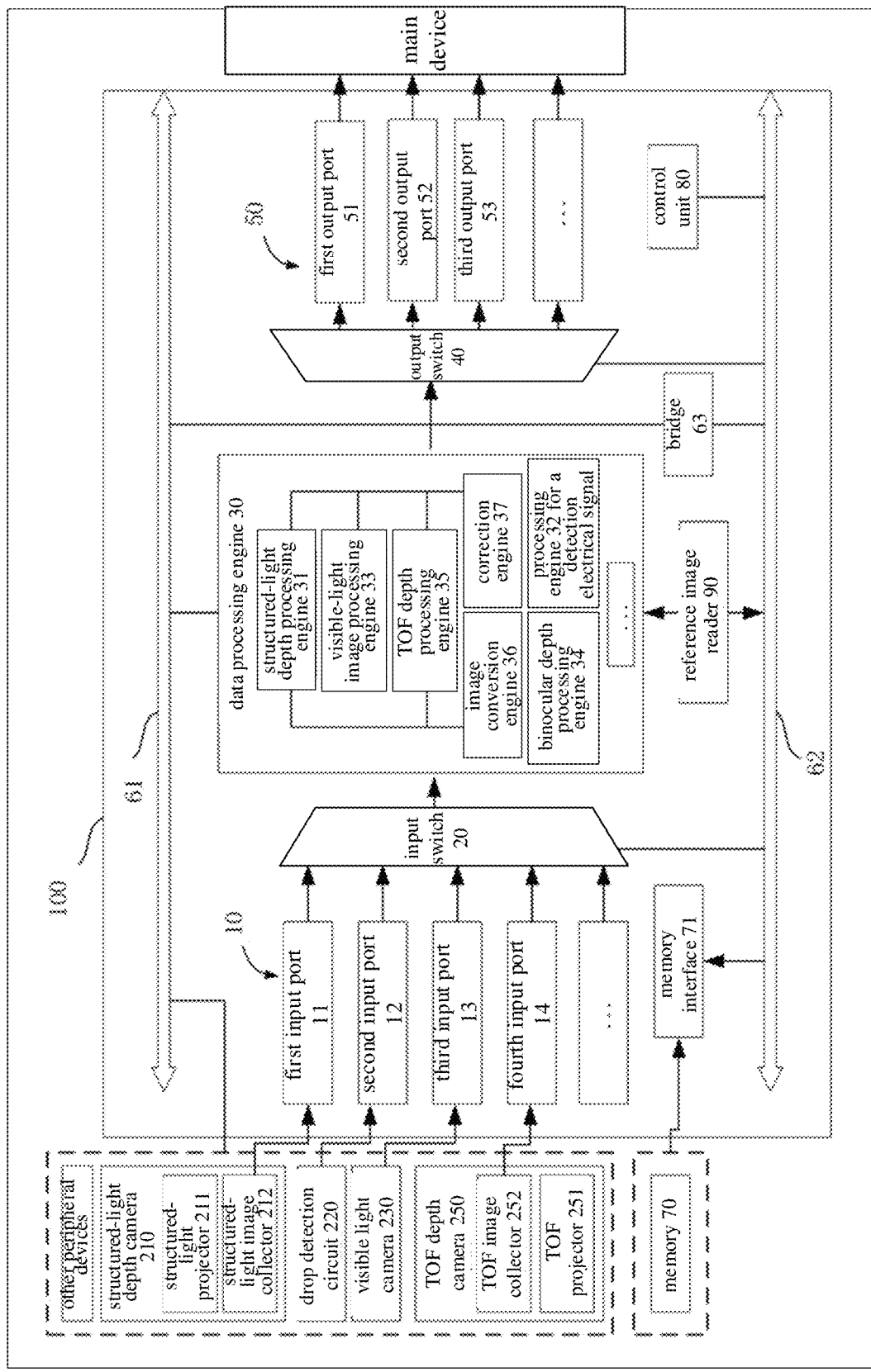
FIG. 1 is a block diagrams illustrating principles of a depth processor according to some implementations of the present disclosure.

Description will be made in detail below to implementations of the present disclosure. Examples of those implementations are illustrated in accompanying drawings. Same or similar reference numerals refer to same or similar elements or elements having same or similar functions throughout. The implementations described below with reference to the accompanying drawings are examples and are intended to explain the present disclosure, and should not be construed as a limitation of the present disclosure.

Figure 2:
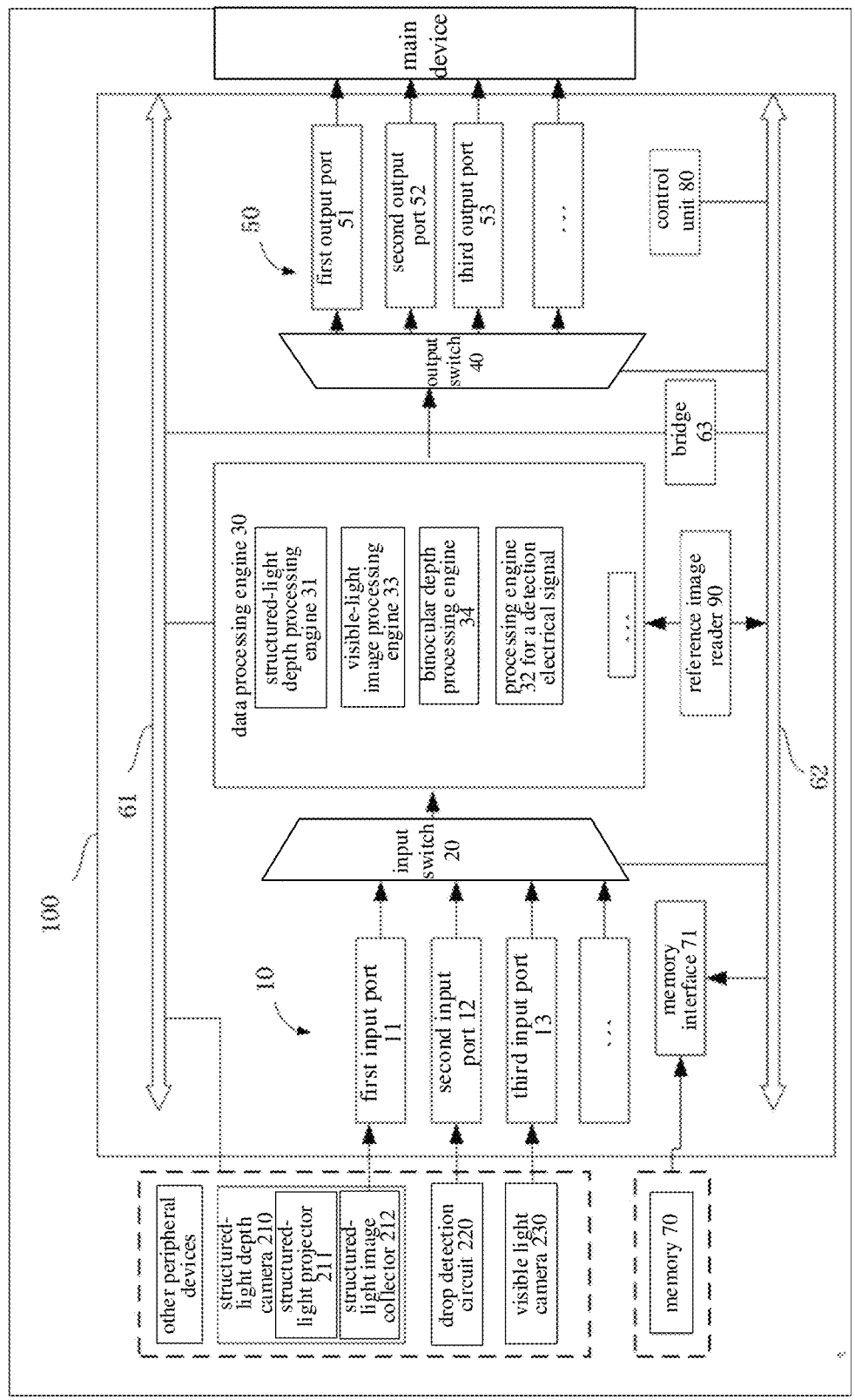
FIG. 2 is a block diagrams illustrating principles of a depth processor according to some implementations of the present disclosure.

Please refer to FIG. 1 and FIG. 2. The present disclosure provides a depth processor 100. The depth processor 100 includes input ports 10, an input switch 20, and a data processing engine 30. In an implementation, the depth processor 100 may further include an output port 50. The input ports 10 are coupled to the input switch 20. The input switch 20 is coupled to the data processing engine 30. The data processing engine 30 is coupled to the output port 50. The input ports 10 are configured to receive first images. The first images at least include a structured-light image collected by a structured-light depth camera 210. The input switch 20 is configured to output a part or all of the first images received by the input ports 10. The data processing engine 30 is configured to process the first images outputted by the input switch 20 to output second images. The second images at least include a depth image. The output port 50 is configured to output the second images to a main device.

The depth processor 100 in the implementation of the present disclosure may have a plurality of input ports 10 disposed thereon, which may be coupled to a plurality of types of peripheral devices and process input data of the plurality of peripheral devices, leading to high integration and universality and applicable to a plurality of application scenes.

Referring to FIG. 1, the present disclosure provides a depth processor 100. The depth processor 100 includes input ports 10, an input switch 20, a data processing engine 30 and an output port 50. The input port 10 is coupled to the input switch 20. The input switch 20 is coupled to the data processing engine 30. The data processing engine 30 is coupled to the output port 50.

There are a number of the input ports 10, such as 2, 3, 4, 5, 7, and 10. Each input port 10 may be coupled to one peripheral device, to receive data collected by the peripheral device. For example, in a detailed implementation of the present disclosure, the peripheral devices may include a structured-light depth camera 210, a drop detection circuit 220 and a TOF (time of flight) depth camera 250. The input ports 10 are coupled to the peripheral devices to receive first images collected by the peripheral devices. The first images may include a structured-light image collected by a structured-light image collector 212 in the structured-light depth camera 210 and a TOF image collected by a TOF image collector 252 in the TOF depth camera 250. The input port 10 may also be coupled to the peripheral device to receive a detection electrical signal outputted by the peripheral device.

In detail, as one of the peripheral devices, the structured-light depth camera 210 consists of a structured-light projector 211 and the structured-light image collector 212. The structured-light projector 211 projects a structured-light pattern (such as, an infrared laser pattern) into a target space. The projected structured-light pattern may be modulated by an object in the target space. The structured-light image collector 212 (such as, an infrared camera) captures a structured-light image modulated by the object. The structured-light image collector 212 is coupled to a first input port 11. The first input port 11 receives the structured-light image collected by the structured-light image collector 212. The structured-light image is transmitted to the data processing engine 30 via the first input port 11 for processing. The data processing engine 30 includes a structured-light depth processing engine 31. The structured-light depth processing engine 31 calculates a structured-light depth image based on the structured-light image and a reference image (i.e., the second images include the structured-light depth image). The reference image is collected by the structured-light image collector 212. The structured-light projector 211 projects the structured-light pattern onto a plane with a known distance from the structured-light projector 211. The structured-light image collector 212 collects a structured-light pattern modulated by the plane with known distance. In this way, the reference image is obtained and stored in a memory 70. The memory 70 is a non-volatile memory 70 (such as, a flash memory). The memory 70 may be included in the depth processor 100, or may be, as the peripheral device, coupled to the depth processor 100 through a memory interface 71. Under a case that the memory 70 is configured as the peripheral device, the memory 70 may be coupled to the data processing engine 30 through the input switch 20. In this way, the reference image may be transmitted to the data processing engine 30 through the input switch 20. The memory 70 may be directly coupled to the data processing engine 30 without the input switch 20. In this way, the reference image may be directly transmitted to the data processing engine 30. There may be a lateral deviation between each pixel in the structured-light image and each corresponding pixel in the reference image. Therefore, the structured-light depth processing engine 31 receives the structured-light image transmitted by the input switch 20, and reads the reference image from the memory 70 by utilizing a reference image reader 90, and then calculates a deviation amount between the structured-light image and the reference image to obtain depth information of a space point corresponding to each pixel in the structured-light image from the structured-light depth camera 210, and finally obtains the structured-light depth image.

Figure 4:
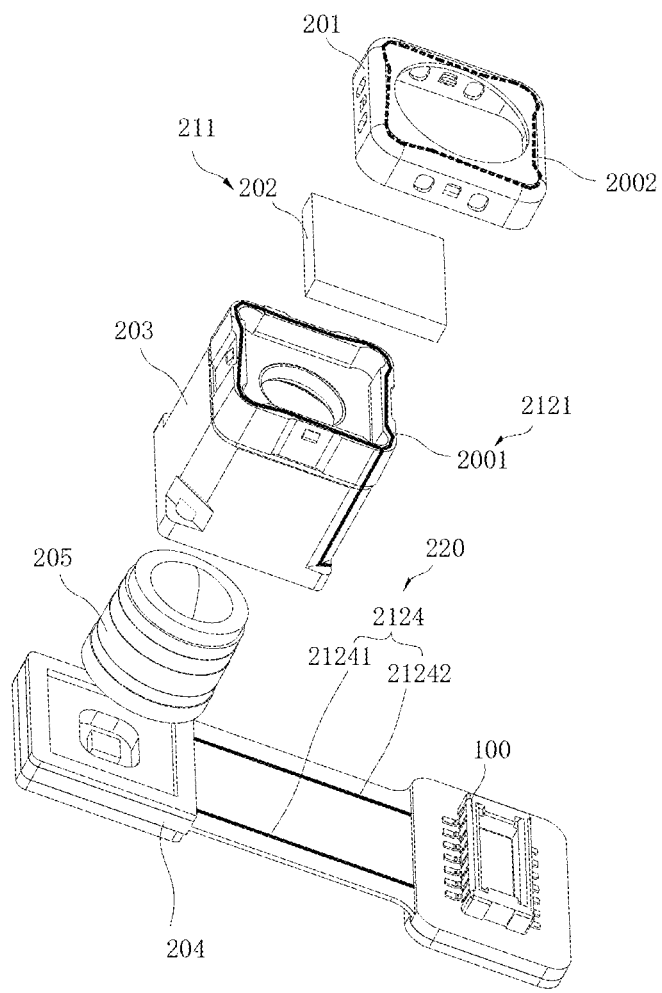
FIG. 4 is a tridimensional schematic diagram illustrating a structured-light projector according to some implementations of the present disclosure.

As illustrated in FIG. 1 and FIG. 4, as one of the peripheral devices, the drop detection circuit 220 is disposed in the structured-light projector 211. The drop detection circuit 220 may output the detection electrical signal for detecting whether a protective cover 201 of the structured-light depth camera 210 drops. The data processing engine 30 may also include a processing engine 32 for the detection electrical signal. The processing engine 32 for the detection electrical signal is configured to determine whether the detection electrical signal is with a preset range, and to determine that the protective cover 201 drops in a case that the detection electrical signal is not within the preset range.

Figure 5:
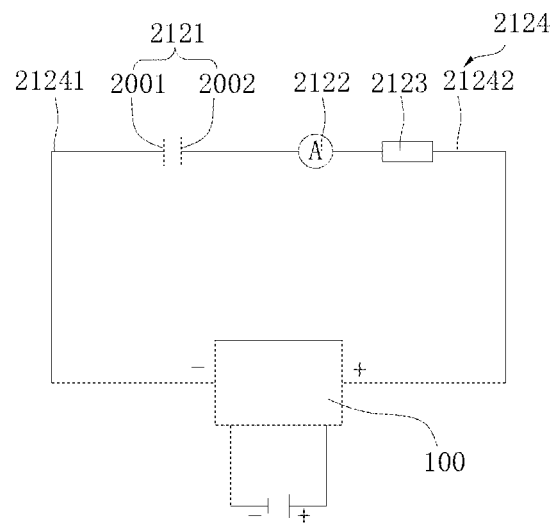
FIG. 5 is a schematic diagram illustrating a working principle of a drop detection circuit according to some implementations of the present disclosure.

In detail, please refer to FIG. 4 and FIG. 5 together. The structured-light projector 211 includes a substrate assembly 204, a lens barrel 203, a collimating element 205, a diffractive optical element 202, and the protective cover 201. The lens barrel 203 is disposed on the substrate assembly 204. The diffractive optical element 202 is disposed in the lens barrel 203. The protective cover 201 is combined with the lens barrel 203 and shields the diffractive optical element 202.

In an example, the drop detection circuit 220 includes a first electrode plate 2001, a second electrode plate 2002, a connection circuit 2124, a resistance element 2123 and a detection device 2122. The first electrode plate 2001, the second electrode plate 2002, the connection circuit 2124, the resistance element 2123 and the detection device 2122 form a detection loop. The first electrode plate 2001 is disposed on the lens barrel 203. The second electrode plate 2002 is disposed on the protective cover 201 and opposite to the first electrode plate 2001 at intervals. The first electrode plate 2001 and the second electrode plate 2002 form a detection capacitor 2121. The connection circuit 2124 is formed in the substrate assembly 204 and the lens barrel 203. The connection circuit 2124 includes a first connection sub-circuit 21241 and second connection sub-circuit 21242. The first connection sub-circuit 21241 is formed on the substrate assembly 204 and the lens barrel 203. An end of the first connection sub-circuit 21241 is coupled to the first electrode plate 2001, and the other end of the first connection sub-circuit 21241 is coupled to a second input port 12. The second connection sub-circuit 21242 is also formed on the substrate assembly 204 and the lens barrel 203. An end of the second connection sub-circuit 21242 is coupled to the second electrode plate 2002, and the other end of the second connection sub-circuit 21242 is coupled to a first bus device 61 (illustrated in FIG. 1) of the depth processor 100. The resistance element 2123 is coupled in the connection circuit 2124 and connected in series with the detection capacitor 2121. The resistance element 2123 may be a resistor. The detection device 2122 is coupled in the connection circuit 2124. When the detection device 2122 is a voltmeter, the detection device 2122 is connected in parallel with the resistance element 2123 and configured to detect a current at both ends of the resistance element 2123. When the detection device 2122 is an ammeter, the detection device 2122 is connected in series with the resistance element 2123 and configured to detect a current flowing through the resistance element 2123.

The first electrode plate 2001 and the second electrode plate 2002 are made of conductive materials. For example, materials of the first electrode plate 2001 and the second electrode plate 2002 may include nickel, palladium, silver, tantalum, carbon materials, metal oxides and conductive polymers. The protective cover 201 may be made of the conductive material. The protective cover 201 may be taken as the second electrode plate 2002. There provided two formulas: $C=\varepsilon S/d$, and $Q=CU$, in which C represents a size of the detection capacitor 2121, $\varepsilon$ represents a dielectric constant between the first electrode plate 2001 and the second electrode plate 2002, S represents an area that the first electrode plate 2001 faces the second electrode plate 2002, d represents a distance between the first electrode plate 2001 and the second electrode plate 2002, Q represents a charge amount on the detection capacitor 2121, and U represents a voltage between the first electrode plate 2001 and the second electrode plate 2002. In a case that the protective cover 201 does not drop from the lens barrel 203, the detection device 2122 may not detect a voltage or a current, which indicates that there is no current flowing through the resistance element 2123, and further indicates that the charge amount on the detection capacitor 2121 does not change. In this case, the detection electrical signal is not outputted, that is, the detection electrical signal is within the preset range, and the processing engine 32 for the detection electrical signal determines that the protective cover 201 does not drop from the lens barrel 203 based on the detection electrical signal. In the case that the protective cover 201 drops from the lens barrel 203, the distance between the first electrode plate 2001 and the second electrode plate 2002 increases, and the charge amount on the detection capacitor 2121 decreases, thereby causing the detection capacitor 2121 to discharge. In this case, the voltage or current detected by the detection device 2122 may change, which indicates that current flows out of the resistance element 2123, and further indicates that the charge amount on the detection capacitor 2121 changes, and the corresponding outputted detection electrical signal may change. In a case that the detection electrical signal exceeds the preset range, the processing engine 32 for the detection electrical signal may determine that the protective cover 201 and the lens barrel 203 drop based on the detection electrical signal. Generally, since the protective cover 201 is configured to restrict the diffractive optical element 202 in the lens barrel 203, the diffractive optical element 202 may also drop from the lens barrel 203 to a large extent in the case that the protective cover 201 drops from the lens barrel 203. Therefore, in the case that the protective cover 201 drops from the lens barrel 203, a light projected by the structured-light projector 211 is not attenuated by the diffractive optical element 202, and has a large intensity. In this case, when a user is performed face recognition, eyes of the user may be damaged. Therefore, when it is determined that the protective cover 201 drops based on the detection electrical signal outputted from the drop detection circuit 220, it is determined that the diffractive optical element 202 may also drop (in other words, when it is detected that the protective cover 201 drops from the lens barrel 203, it may be indirectly determined that the diffractive optical element 202 drops). At this time, the structured-light projector 211 may be turned off. Compared with the structured-light projector 211 stopping emitting a laser light after it is directly detected that the diffraction optical element 202 drops, safety guarantee is advanced, and safety of protecting the user from using the structured-light projector 211 is improved.

Figure 6:
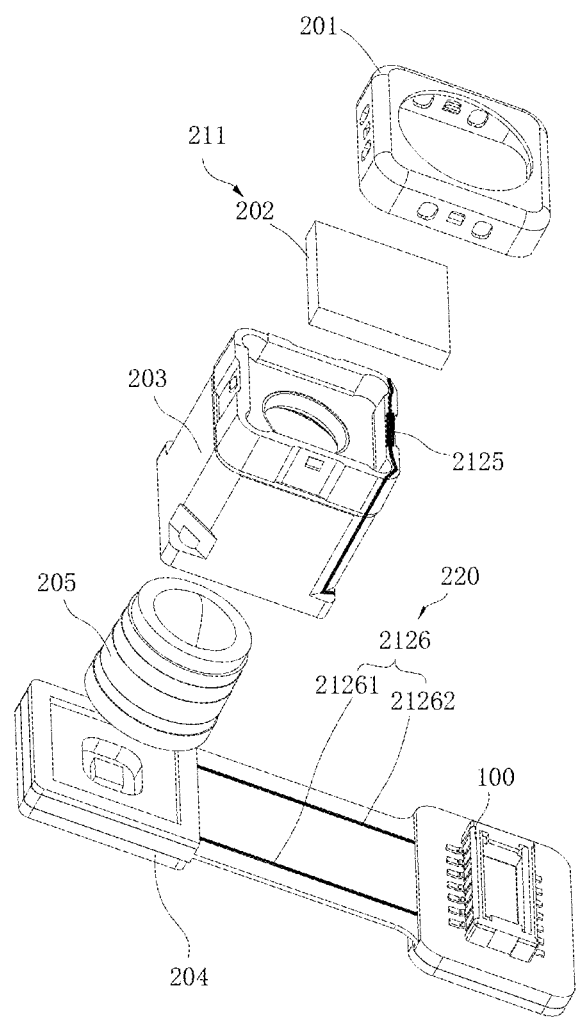
FIG. 6 is a tridimensional schematic diagram illustrating a structured-light projector according to some implementations of the present disclosure.
Figure 7:
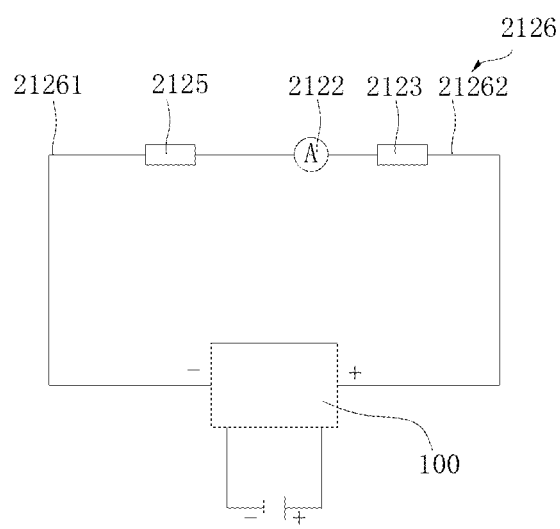
FIG. 7 is a schematic diagram illustrating a working principle of a drop detection circuit according to some implementations of the present disclosure.

Please refer to FIG. 6 and FIG. 7 together. In another example, the drop detection circuit 220 includes a pressure sensor 2125, a connection circuit 2126, a resistance element 2123 and a detection device 2122. The pressure sensor 2125, the connection circuit 2126, the resistance element 2123 and the detection device 2122 form a detection loop. The pressure sensor 2125 may be a piezoresistive pressure sensor (strain gauge), a piezoelectric pressure sensor, or the like. The pressure sensor 2125 is disposed between the lens barrel 203 and the protective cover 201 and receives pressure. The connection circuit 2126 is formed on a substrate assembly 204 and a lens barrel 203. The connection circuit 2126 includes a first connection sub-circuit 21261 and a second connection sub-circuit 21262. The first connection sub-circuit 21261 is formed on the substrate assembly 204 and the lens barrel 203. One end of the first connection sub-circuit 21261 is coupled to one end of the pressure sensor 2125, and the other end of the first connection sub-circuit 21261 is coupled to the second input port 12. The second connection sub-circuit 21262 is also formed on the substrate assembly 204 and the lens barrel 203. One end of the second connection sub-circuit 21262 is coupled to the other end of the pressure sensor 2125, and the other end of the second connection sub-circuit 21262 is coupled to the first bus device 61 of the depth processor 100. The resistance element 2123 is connected in the connection circuit 2126 and connected in series with the pressure sensor 2125. The resistance element 2123 may be a resistor. The detection device 2122 is connected in the connection circuit 2126. When the detection device 2122 is a voltmeter, the detection device 2122 is connected in parallel with the resistance element 2123 and configured to detect a voltage across the resistance element 2123. When the detection device 2122 is an ammeter, the detection device 2122 is connected in series with the resistance element 2123 and configured to detect a current flowing through the resistance element 2123.

When the protective cover 201 is combined with the lens barrel 203, the pressure sensor 2125 is clamped in the lens barrel 203 by the protective cover 201 and is subjected to a clamping force (i.e., pressure). In the case that the protective cover 201 drops from the lens barrel 203, the protective cover 201 releases (separates from) the pressure sensor 2125, such that the pressure sensor 2125 is not subjected to the clamping force. At this time, the pressure sensor 2125 changes (for example, a resistance increases or decreases), and the detection electrical signal outputted by the drop detection circuit 220 changes. The processing engine 32 for the detection electrical signal determines that the protective cover 201 drops based on a change of the detection electrical signal. For example, when the protective cover 201 is combined with the lens barrel 203 and the pressure sensor 2125 is clamped between the protective cover 201 and the lens barrel 203, the pressure sensor 2125 is pressed and deformed, and the resistance of the pressure sensor 2125 is R1 at this time. When the protective cover 201 drops from the lens barrel 203, the pressure of the pressure sensor 2125 becomes zero, and the resistance of the pressure sensor 2125 is R2. R1 is not equal to R2. The voltage or current detected by the detection device 2122 may change, that is, the detection electrical signal outputted by the drop detection circuit 220 may change. The processing engine 32 for the detection electrical signal determines that the protective cover 201 drops based on a change of the detection electrical signal in a case that the change of the detection electrical signal exceeds a predetermined range. The pressure sensor 2125 is pressed in a case that the protective cover 201 does not drop from the lens barrel 203, and the resistance of the pressure sensor 2125 is R3 at this time. Generally, R3 is equal to R1. When the detection device 2122 does not detect a change of the voltage or the current, that is, the detection electrical signal outputted by the drop detection circuit 220 does not change, the processing engine 32 for the detection electrical signal determines that the protective cover 201 does not drop based on the change of the detection electrical signal. Generally, since the protective cover 201 is configured to restrict the diffractive optical element 202 in the lens barrel 203, the diffractive optical element 202 may also drop from the lens barrel 203 to a large extent when the protective cover 201 drops from the lens barrel 203. Therefore, in the case that the protective cover 201 drops from the lens barrel 203, a light projected by the structured-light projector 211 is not attenuated by the diffractive optical element 202, and has a large intensity. In this case, when a user is performed face recognition on, eyes of the user may be damaged. Therefore, when it is determined that the protective cover 201 drops based on the detection electrical signal outputted from the drop detection circuit 220, it is determined that the diffractive optical element 202 may also drop (in other words, when it is detected that the protective cover 201 drops from the lens barrel 203, it may be indirectly determined that the diffractive optical element 202 drops). At this time, the structured-light projector 211 may be turned off. Compared with the structured-light projector 211 stopping emitting a laser light after it is directly detected that the diffraction optical element 202 drops, safety guarantee is advanced, and safety of protecting the user from using the structured-light projector 211 is improved.

Figure 8:
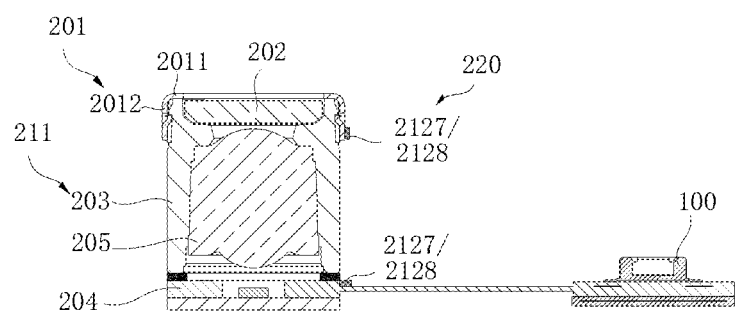
FIG. 8 is a block diagram illustrating a structured-light projector according to some implementations of the present disclosure.

Please refer to FIG. 8. In another example, the protective cover 201 includes a protective top wall 2011 and a protective side wall 2012 extending from a periphery of the protective top wall 2011. The protective side wall 2012 is combined with the lens barrel 203. The protective top wall 2011 may limit a position of the diffractive optical element 202. The drop detection circuit 220 includes a transmitter 2127 and a receiver 2128. At least one of the transmitter 2127 and the receiver 2128 is disposed on the protective side wall 2012, and the other is disposed on the substrate assembly 204. For example, the transmitter 2127 is disposed on the protective side wall 2012, and the receiver 2128 is disposed on the substrate assembly 204. Alternatively, the transmitter 2127 is disposed on the substrate assembly 204, and the receiver 2128 is disposed on the protective side wall 2012. The transmitter 2127 and the receiver 2128 are oppositely disposed. The transmitter 2127 is configured to transmit a detection signal, and the receiver 2128 is configured to receive the detection signal transmitted by the transmitter 2127. The detection signal may be an optical signal, such as infrared light. The detection signal may also be an ultrasonic signal. In an example, the transmitter 2127 is an infrared light emitting diode, and the receiver 2128 is an infrared light receiver 2128. When the drop detection circuit 220 works, the transmitter 2127 transmits the detection signal to the receiver 2128, and the receiver 2128 receives the detection signal transmitted by the transmitter 2127 and forms the detection electrical signal for outputting. In a case that the detection electrical signal is within the preset range, it may be determined that a current position of the transmitter 2127 relative to the receiver 2128 does not change greatly, thereby determining that a position of the protective cover 201 relative to the substrate assembly 204 does not change greatly, and further determining that the protective cover 201 does not drop. In a case that the detection detected electrical signal exceeds the preset range, it may be determined that the current position of the transmitter 2127 relative to the receiver 2128 changes greatly, thereby determining that the position of the protective cover 201 relative to the substrate assembly 204 changes greatly, and further determining that the protective cover 201 drops. Generally, since the protective cover 201 is configured to restrict the diffractive optical element 202 in the lens barrel 203, the diffractive optical element 202 may also drop from the lens barrel 203 to a large extent when the protective cover 201 drops from the lens barrel 203. Therefore, in the case that the protective cover 201 drops from the lens barrel 203, a light projected by the structured-light projector 211 is not attenuated by the diffractive optical element 202 and has a large intensity. In this case, when a user is performed face recognition, eyes of the user may be damaged. Therefore, when it is determined that the protective cover 201 drops based on the detection electrical signal outputted by the drop detection circuit 220, it is determined that the diffractive optical element 202 may also drop (in other words, when it is detected that the protective cover 201 drops from the lens barrel 203, it may be indirectly determined that the diffractive optical element 202 drops). At this time, the structured-light projector 211 may be turned off. Compared with the structured-light projector 211 stopping emitting a laser light after it is directly detected that the diffraction optical element 202 drops, safety guarantee is advanced, and safety of protecting the user from using the structured-light projector 211 is improved.

Figure 9:
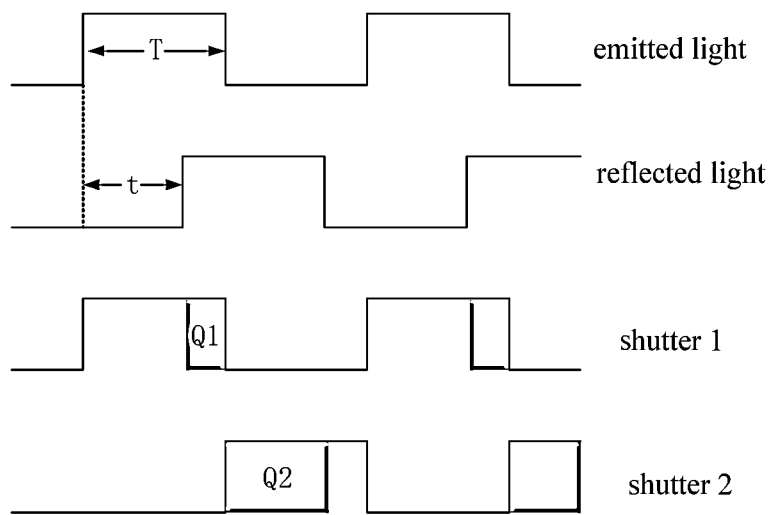
FIG. 9 is a schematic diagram illustrating a principle for obtaining depth information based on a TOF time according to some implementations of the present disclosure.

Please refer to FIG. 1, as one of the peripheral devices, the TOF depth camera 250 includes a TOF projector 251 and the TOF image collector 252. The TOF depth camera 250 obtains a distance between an object in the target space and the TOF depth camera 250 by detecting a flight (round-trip) time of a light pulse. The TOF depth camera 250 generally obtains the distance in a direct acquisition way or an indirect acquisition way. In the direct acquisition way, the TOF projector 251 emits an infrared light into the target space, and an emitting time point at which the TOF projector 251 emits the infrared light into the target space may be recorded. The TOF image collector 252 is synchronously turned on at the emitting time point to receive the infrared light reflected by the object in the target space, and a receiving time point at which the TOF image collector 252 receives the infrared light reflected by the object may also be recorded. The distance between the object in the target space and the TOF depth camera 250 may be calculated based on a time difference between the emitting time point and the receiving time point. In the indirect acquisition way, the TOF projector 251 emits an infrared light modulated by a square wave pulse into the target space. The TOF image collector 252 collects the infrared light in one or more complete pulse periods. Each pixel in the TOF image collector 252 consists of a photosensitive component. The photosensitive component may convert the received infrared light into a current. The photosensitive device may be coupled to a plurality of high-frequency switches, and lead the current into different capacitors which may store electric charges. Thus, by controlling the high-frequency switches to be turned on and off, the received infrared light in one or more complete pulse periods is divided into two parts. The distance between the object and the TOF depth camera 250 may be calculated based on currents corresponding to the infrared light in the two parts. For example, as illustrated in FIG. 9, the electric charges accumulated by the infrared light in the two parts are Q1 and Q2 respectively. When a duration of a laser in a pulse period is T, a propagation time of the infrared light in the target space is $$t = T \times \frac{Q2}{Q1 + Q2},$$

and the distance is $$d = \frac{1}{2} \times c \times t,$$

where, c represents a light speed. In a detailed implementation of the present disclosure, the distance is calculated in the indirect acquisition way. The TOF image collector 252 converts the received infrared light to a current signal and output the current signal to form the TOF image. Each pixel in the TOF image includes two parts of current data. The TOF image collector 252 is coupled to a fourth input port 14, and the fourth input port 14 receives the TOF image collected by the TOF image collector 252. The data processing engine 30 also includes a TOF depth processing engine 35. The TOF depth processing engine 35 receives the TOF image from the fourth input port 14, and then calculates the distance between the object and the TOF depth camera 250 based on the TOF image, thereby obtaining a TOF depth image (i.e., the second images include the TOF depth image).

There may be one or more output ports 50, such as 1, 2, 3, 4, 5, 7, 10 and the like. When there is one output port 50, the second image and a determination result may be outputted separately. For example, the structured-light depth image, the TOF depth image and a determination result may be outputted separately. When there are a number of output ports 50, the second images and the determination result may be outputted simultaneously. For example, the first output port 51 outputs the structured-light depth image, the second output port 52 outputs the determination result, and the third output port 53 outputs the TOF depth image.

It should be understood that, presently, a special processor is usually employed to process the structured-light image and the reference image to obtain the depth image. When the detection circuit is added to the structured-light projector 211, the detection electrical signal outputted by the detection circuit usually needs to be transmitted to other processors for processing, but may not be directly transmitted to the specific processor which is employed to process the structured-light image and the reference image to obtain the depth image for processing. As a result, integration of the specific processor for processing the structured-light image is low, which is not conducive to development of other functions. The depth processor 100 of the present disclosure may be coupled to a plurality of types of peripheral devices, and process input data of the plurality of types of peripheral devices, which has high integration and universality, and may be applicable to a plurality of different types of devices and various application scenes. In detail, with the depth processor 100 according to the implementation of the present disclosure, the drop detection circuit 220 may be, as a peripheral device, accessed into the depth processor 100. In this way, the depth processor 100 may not only process the structured-light image, but also perform drop-preventing detection judgment, and the depth processor 100 has higher integration and more perfect functions. In addition, when the depth processor 100 of the present disclosure is installed on a mobile phone, the depth processor 100 may be simultaneously coupled to the structured-light depth camera 210 and the TOF depth camera 250. Since the structured-light depth camera 210 has higher accuracy in obtaining depth information at a short distance and the TOF depth camera 250 has higher accuracy in obtaining depth information at a long distance, the structured-light depth camera 210 may be configured as a front device to unlock a three-dimensional face, and the TOF depth camera 250 may be configured as a rear device to perform three-dimensional modeling on a scene. In an embodiment, the structured-light depth camera 210 and the TOF depth camera 250 are switched in response to a switching instruction, the structured-light depth camera 210 may be configured as a rear device and the TOF depth camera 250 may be configured as a front device. In this way, since the depth processor 100 may be simultaneously coupled to the structured-light depth camera 210 and the TOF depth camera 250, and simultaneously process the structured-light image to obtain the structured-light depth image and process the TOF image to obtain the TOF depth image, there is no need to set a processor specialized to processing the structured-light image and a processor specialized to processing the TOF image, which improves the integration of the depth processor 100 and reduces occupation for a placing space of the mobile phone.

Please refer to FIG. 1, in some implementations, a visible light camera 230 may also be as the peripheral device to couple to the depth processor 100. The visible light camera 230 is configured to collect a visible light image (i.e., the first images include the visible light image). The visible light camera 230 is coupled to a third input port 13. The visible light image collected by the visible light camera 230 is transmitted to the data processing engine 30 through the third input port 13. The data processing engine 30 may also include a visible-light image processing engine 33. The visible-light image processing engine 33 may perform processing on the visible light image, such as de-noising, and format conversion.

Further, as illustrated in FIG. 1, in some implementations, the data processing engine 30 also includes a binocular depth processing engine 34. The binocular depth processing engine 34 may receive an infrared image inputted from the first input port 11 (i.e., the first images include the infrared image) and the visible light image inputted from the third input port 13. The infrared image is obtained by the structured-light image collector 212 when the structured-light projector 211 is turned off. The binocular depth processing engine 34 may calculate the depth information of the object in the target space based on the infrared image and the visible light image, that is, a binocular depth image. Generally, when an ambient brightness of the target space is dark (such as, lower than a preset brightness value), the depth image is calculated by the structured-light depth processing engine 31, and when the ambient brightness of the target space is bright (such as, greater than or equal to the preset brightness value), the depth image is calculated by the binocular depth processing engine 34. It may be understood that, when the ambient brightness is brighter, there are a plurality of infrared amounts in the ambient light. Since the laser light emitted by the structured-light projector 211 is usually the infrared light, the infrared light in the ambient light may affect the structured-light image collected by the structured-light image collector 212, which further cause low calculation accuracy of the depth image. When the intensity of the ambient light is higher, the visible light image collected by the visible light camera 230 and the infrared image collected by the structured-light image collector 212 are clearer, thus the depth information of the object in the target space may be calculated in a triangulation way.

Please refer to FIG. 1, in some implementations, the visible-light image processing engine 33 may also be configured to process the visible light image to identify the object in the visible light image of which a capturing area is smaller than a preset area. In detail, the visible-light image processing engine 33 employs an edge detection algorithm (e.g., a Sobel edge detection algorithm, a Laplace algorithm, or a Canny edge detection algorithm) to detect an edge of each object in the visible light image, and then calculates the size of the capturing area corresponding to each object based on a closed edge curve (there is no need to recognize the type of the object). When the capturing area is smaller than the preset area, a corresponding volume of the object in the target space is also smaller. In this case, when the structured-light depth camera 210 is employed to obtain the depth information of the object in the target space, since the structured-light pattern projected by the structured-light projector 211 is a speckle pattern, the speckle pattern may not cover all the objects existing in the target space after being projected into the target space (there are gaps between light spots, especially a part of a region of an object with a small volume may just be in the gap, and this part of the region may not be irradiated by the light spots, even a small object happens to be completely in the gap and may not be irradiated by the light spots), which may cause a low accuracy of the calculated depth information of the object not covered by the speckle pattern, and even may not detect the depth at all. Therefore, the data processing engine 30 also includes a correction engine 37. The correction engine 37 is coupled to the structured-light depth processing engine 31, the TOF depth processing engine 35 and the visible-light image processing engine 33. The correction engine 37 obtains one or more pixels corresponding to the object of which the capturing area is smaller than the preset area from the visible-light image processing engine 33, in which the object is obtained by the visible-light image processing engine 33 processing the visible light image. The correction engine 37 obtains the structured-light depth image from the structured-light depth processing engine 31, obtains the TOF depth image from the TOF depth processing engine 35, and corrects the depth information of pixels with lower accuracy in the structured-light depth image based on the one or more pixels and the TOF depth image. In detail, the correction engine 37 aligns the visible light image, the structured-light depth image and the TOF depth image, such that the visible light image, the structured-light depth image and the TOF depth image have a same field of view. Based on the one or more pixels (called as first pixels here) obtained by processing the object of which the capturing area smaller than the preset area in the visible light image, second pixels corresponding to these first pixels one by one may be found in the TOF depth image. Based on the second pixels in the TOF depth image, third pixels corresponding to the second pixels one by one may be found in the structured-light depth image, and depth information of the third pixels is replaced by the depth information of the second pixels to correct the depth information of the structured-light depth image, thereby improving the accuracy of the depth information of the structured-light depth image.

Please refer to FIG. 1, in some implementations, the depth processor 100 also includes an output switch 40 coupled between the data processing engine 30 and the output port 50. The output switch 40 is configured to output the determination result obtained based on the detection electrical signal, and all or a part of the second images to the main device. The main device may be a mobile phone, a tablet, a notebook, a wearable device (such as a smart watch, a smart bracelet, smart glasses, a smart helmet, etc.), or a virtual reality device. The second images include the structured-light depth image, the binocular depth image, the visible light depth image and the TOF depth image. Based on a requirement of the main device, the output switch 40 may separately output the structured-light depth image, the binocular depth image, the visible light image or the TOF depth image separately, may simultaneously output the structured-light depth image and the binocular depth image, simultaneously output the structured-light depth image and the visible light image or simultaneously output the binocular depth image and the TOF depth images, and may simultaneously the structured-light depth image, the binocular depth image, the visible light image or the TOF depth image.

Figure 10:
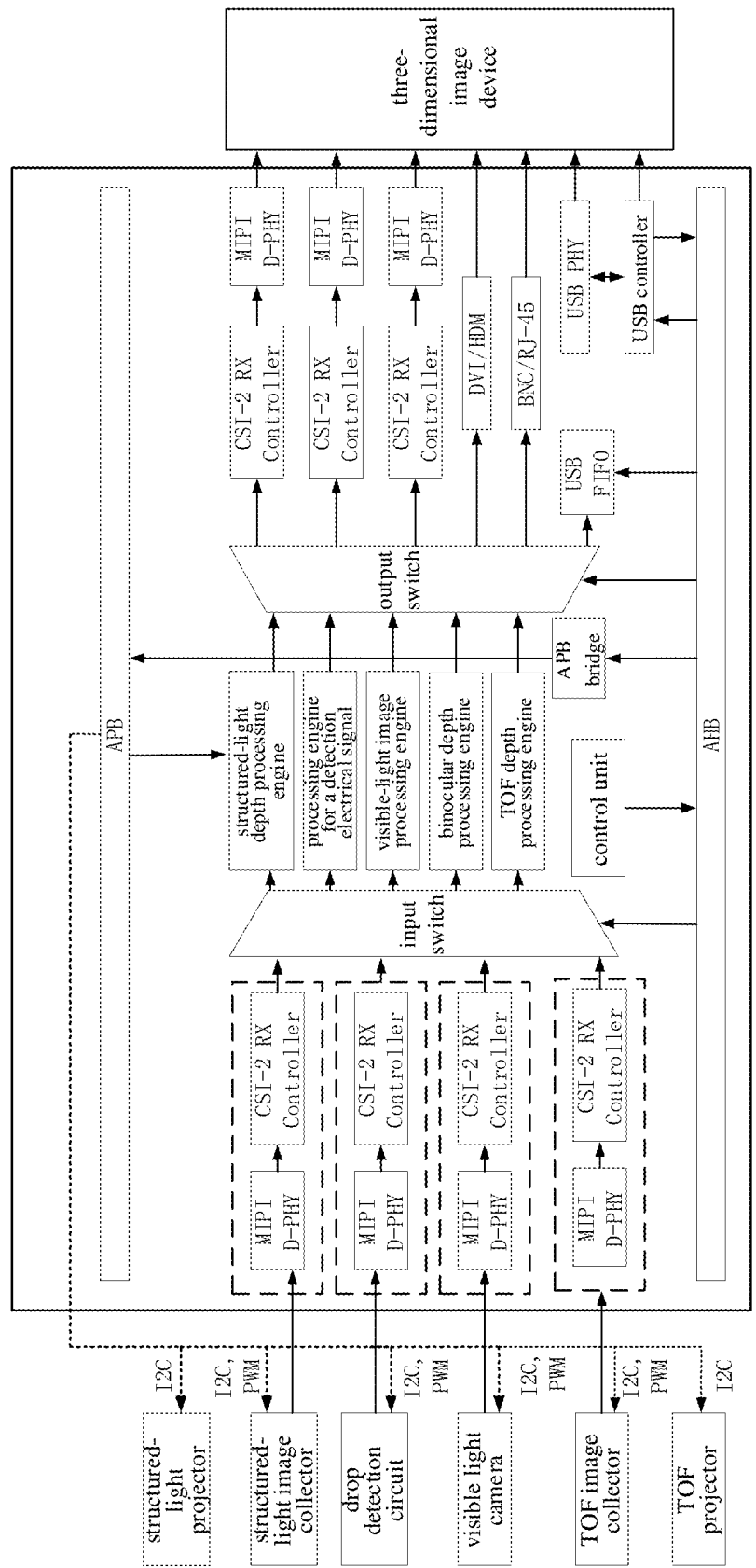
FIG. 10 is a block diagram illustrating details of the depth processor in FIG. 1.

Please refer to FIG. 1, in some implementations, the depth processor 100 may also include at least one bus. The bus is responsible for data transmission among various parts, as well as switching and power control of the peripheral devices (such as the structured-light projector 211, the structured-light image collector 212, the drop detection circuit 220, the visible light camera 230, the TOF projector 251, and the TOF image collector 252). As illustrated in FIG. 10, in a detailed embodiment of the present disclosure, the depth processor 100 has two buses: a first bus device 61 and a second bus device 62. The first bus device 61 may employ an APB (Advanced Peripheral Bus) bus, the second bus device 62 employ an AHB (Advanced High Performance Bus) bus with high performance, and the two buses are coupled through an APB bridge 63. In detail, the first bus device 61 controls synchronous triggering of the peripheral devices through an I2C (Inter-Integrated Circuit), or controls powers of the peripheral devices through a PWM (pulse width modulation). The second bus device 62 is coupled to a control unit 80. The control unit 80 manages an interface of the input switch 20, an interface of the output switch 40, interfaces of peripheral devices and the like through the second bus device 62. For example, the control unit 80 controls the input switch 20 to select and input a required first image to the data processing engine 30 through the second bus device 62 based on an actual application requirement, and the control unit 80 controls the output switch 40 to selectively output the second image through the second bus device 62 based on an actual application requirement.

In some implementations, the main device controls the peripheral devices to be turned on through the first bus device 61. For example, when the ambient brightness is low, the main device controls the structured-light depth camera 210 to be turned on through the first bus device 61, to obtain the depth information of the object in the target space by utilizing the structured-light depth camera 210. When the ambient brightness is high, the main device controls the structured-light image collector 212 and the visible light camera 230 to be turned on through the first bus device 61, to obtain the depth information of the object in the target space by utilizing a binocular tridimensional vision method.

In some implementations, the first bus device 61 is also configured to control a required peripheral device to be turned on based on the type of the depth image required by the main device. It may be understood that, some main devices may not be compatible with processing or displaying the depth images obtained by a plurality of depth cameras. In this case, the main device may transmit the type of the depth camera corresponding to the depth image that may be processed or displayed by itself to the first bus device 61. The first bus device 61, based on a requirement of the main device, controls the depth camera corresponding to the requirement to be turned on. In this way, the compatibility and universality of the depth processor 100 may be further improved.

Of course, in some implementations, the data processing engine 30 also includes an image conversion engine 36.

When the main device may not compatibly process or display the depth images obtained by the plurality of depth cameras, processing may be performed on the depth images at this time, to convert the depth images into a type of depth images that the main device may process or display. The processing includes adjustment for parameters such as a visual vertebral body and a resolution. For example, a certain main device may only process or display the structured-light image obtained by the structured-light depth camera 210, but may not process or display the TOF depth image obtained by the TOF depth camera 250. When three-dimensional modeling is performed on a certain target space, the field of view of the structured-light depth camera 210 is limited, and the depth information of the objects in the target space may not be obtained at one time by only using the structured-light depth camera 210. In this case, the depth information of the remaining objects may be obtained with the aid of the TOF depth camera 250. However, due to a particularity that the main device may not process or display the TOF depth image obtained by the TOF depth camera 250, the image conversion engine 36 may be configured to convert the parameters such as the visual vertebral body and the resolution of the TOF depth image to obtain another structured-light depth image. In this way, two structured-light depth images are outputted to the main device for further processing by the main device, which may improve compatibility and universality of the depth processor 100.

In some implementations, when the protective cover 201 drops, the main device controls the structured-light projector 211 to be turned off through the first bus device 61. In this way, the structured-light projector 211 is turned off in time to avoid damaging the eyes of the user.

Please refer to FIG. 2, the present disclosure also provides a depth processor 100. The depth processor 100 includes input ports 10, an input switch 20, a data processing engine 30 and an output port 50. The input port 10 is coupled to the input switch 20. The input switch 20 is coupled to the data processing engine 30. The data processing engine 30 is coupled to the output port 50. There are a number of the input ports 10. Each input port 10 may be coupled to one peripheral device, to receive data collected by the peripheral device. For example, in a detailed implementation of the present disclosure, the peripheral devices may include a structured-light depth camera 210 and a drop detection circuit 220. The input ports 10 are coupled to the peripheral devices to receive first images collected by the peripheral devices. The first images may include a structured-light image collected by a structured-light image collector 212 in the structured-light depth camera 210. The input ports 10 are also coupled to the peripheral devices to receive the detection electrical signals outputted by the peripheral devices. The data processing engine 30 includes a structured-light depth processing engine 31 and a processing engine 32 for a detection electrical signal. Detailed structures of the structured-light depth camera 210 and the drop detection circuit 220 are as described above, and functions of the structured-light depth processing engine 31 and the processing engine 32 for the detection electrical signal are as described above (i.e., as described in the above implementations in which the peripheral devices of the depth processor 100 include the structured-light depth camera 210, the drop detection circuit 220 and the TOF depth camera 250), which may not be elaborated here. There may be one or more output ports 50 for outputting a second image (such as a structured-light depth image obtained by the structured-light depth processing engine 31 processing the first image) and a determination result (the determination result obtained by the processing engine 32 for the detection electrical signal based on the detection electrical signal).

The peripheral devices may also include a visible light camera 230. The visible light camera 230 is configured to collect a visible light image (i.e., the first images include the visible light image). The visible light camera 230 is coupled to a third input port 13. The visible light image collected by the visible light camera is transmitted to the data processing engine 30 via the third input port 13. The data processing engine 30 also includes a visible-light image processing engine 33. The visible-light image processing engine 33 may perform processing, such as de-noising and format conversion, on the visible light image.

The data processing engine 30 also includes a binocular depth processing engine 34. The binocular depth processing engine 34 may receive an infrared image inputted from the first input port 11 (i.e., the first images include the infrared image) and the visible light image inputted from the third input port 13. Detailed functions of the binocular depth processing engine 34 are as described above, which are not elaborated here.

The depth processor 100 also includes an output switch 40 coupled between the data processing engine 30 and the output port 50. The output switch 40 is configured to output the determination result obtained based on the detection electrical signal, and all or a part of the second images to the main device.

The depth processor 100 may also include at least one bus. The bus is responsible for data transmission among various parts, as well as switching and power control of the peripheral devices (such as the structured-light projector 211, the structured-light image collector 212, the drop detection circuit 220, and the visible light camera 230).

When the protective cover 201 drops, the main device controls the structured-light projector 211 to be turned off through the first bus device 61 in the bus. In this way, the structured-light projector 211 is turned off in time to avoid damaging the eyes of the user.

With the depth processor 100 according to the implementation of the present disclosure, the drop detection circuit 220 as a peripheral device may be accessed into the depth processor 100. In this way, the depth processor 100 may not only process the structured-light image, but also perform drop-preventing detection judgment, and the depth processor 100 has higher integration and more perfect functions.

Figure 3:
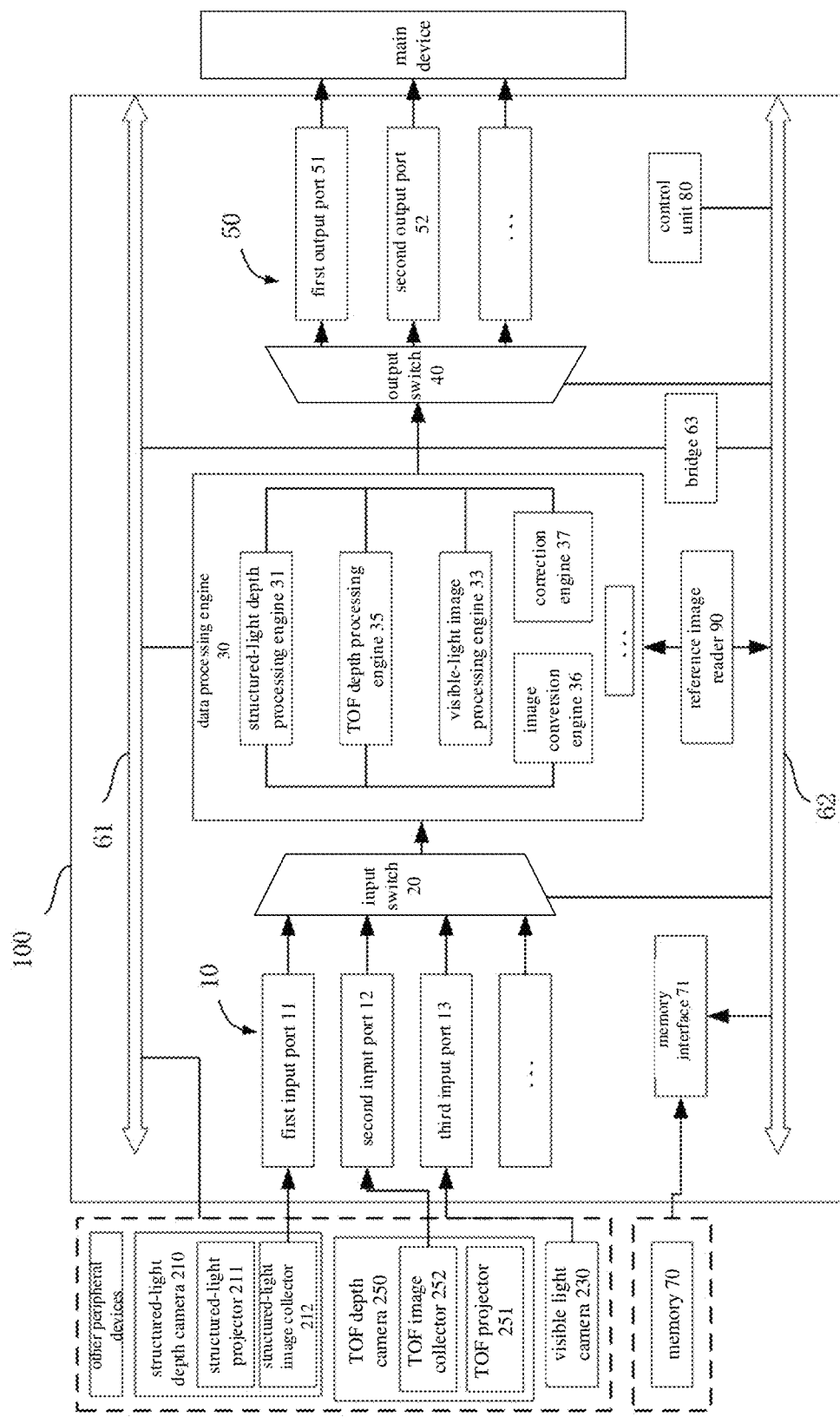
FIG. 3 is a block diagrams illustrating principles of a depth processor according to some implementations of the present disclosure.

Please refer to FIG. 3, the present disclosure also provides a depth processor 100. The depth processor 100 includes input ports 10, an input switch 20, a data processing engine 30 and an output port 50. The input port 10 is coupled to the input switch 20. The input switch 20 is coupled to the data processing engine 30. The data processing engine 30 is coupled to the output port 50. There are a number of the input ports 10. Each input port 10 may be coupled to one peripheral device, to receive data collected by the peripheral device. For example, in a detailed implementation of the present disclosure, the peripheral devices may include a structured-light depth camera 210 and a TOF depth camera 250. The first images may include a structured-light image collected by a structured-light image collector 212 in the structured-light depth camera 210 and a TOF image collected by a TOF image collector 252 in the TOF depth camera 250. The data processing engine 30 includes a structured-light depth processing engine 31 and a TOF depth processing engine 35. Detailed structures of the structured-light depth camera 210 and the TOF depth camera 250 are as described above, and functions of the structured-light depth processing engine 31 and the TOF depth processing engine 35 are as described above, which may not be elaborated here. There may be one or more output ports 50 for outputting second images, such as a structured-light depth image obtained by the structured-light depth processing engine 31 processing the first image and a TOF depth image obtained by the TOF depth processing engine 35 processing the TOF image.

The peripheral devices may also include a visible light camera 230. The visible light camera 230 is configured to collect a visible light image (i.e., the first images include the visible light image). The visible light camera 230 is coupled to a third input port 13. The visible light image collected by the visible light camera is transmitted to the data processing engine 30 via the third input port 13. The data processing engine 30 also includes a visible-light image processing engine 33. The visible-light image processing engine 33 may perform processing, such as de-noising and format conversion, on the visible light image.

The visible-light image processing engine 33 may also be configured to process the visible light image to recognize an object in the visible light image of which a capturing area is smaller than a preset area. The data processing engine 30 also includes a correction engine 37. The correction engine 37 may correct the structured light image. The detailed correction procedure is as described above, and may not be elaborated here.

The depth processor 100 also includes an output switch 40 coupled between the data processing engine 30 and the output port 50. The output switch 40 is configured to output all or a part of the second images to the main device.

The depth processor 100 may also include at least one bus. The bus is responsible for data transmission among various parts, as well as switching and power control of the peripheral devices (such as the structured-light projector 211, the structured-light image collector 212, the TOF projector 251, the TOF image collector 252, and the visible light camera 230). The main device may control the peripheral devices to be turned on through the first bus device 61 in the bus. The first bus device 61 may, based on a type of the depth image required by the main device, control the peripheral device corresponding to the requirement to be turned on.

The data processing engine 30 also includes an image conversion engine 36. When the main device may not compatibly process or display the depth images obtained by the plurality of depth cameras, the data processing engine 30 may perform processing on the depth images, to convert the depth images into the type of depth images that the main device may process or display.

The depth processor 100 according to this implementation of the present disclosure may be simultaneously coupled to the structured-light depth camera 210 and the TOF depth camera 250. Since the structured-light depth camera 210 has higher accuracy in obtaining depth information at a short distance and the TOF depth camera 250 has higher accuracy in obtaining depth information at a long distance, the structured-light depth camera 210 may be configured as a front device to unlock a three-dimensional face, and the TOF depth camera 250 may be configured as a rear device to perform three-dimensional modeling on a scene. In an embodiment, the structured-light depth camera 210 and the TOF depth camera 250 are switched in response to a switching instruction, the structured-light depth camera 210 may be configured as a rear device and the TOF depth camera 250 may be configured as a front device. In this way, since the depth processor 100 may be simultaneously coupled to the structured-light depth camera 210 and the TOF depth camera 250, and simultaneously process the structured-light image to obtain the structured-light depth image and process the TOF image to obtain the TOF depth image, there is no need to set a processor specialized to processing the structured-light image and a processor specialized to processing the TOF image, which improves the integration of the depth processor 100 and reduces occupation for a placing space of an electronic device (such as, a mobile phone).

Figure 11:
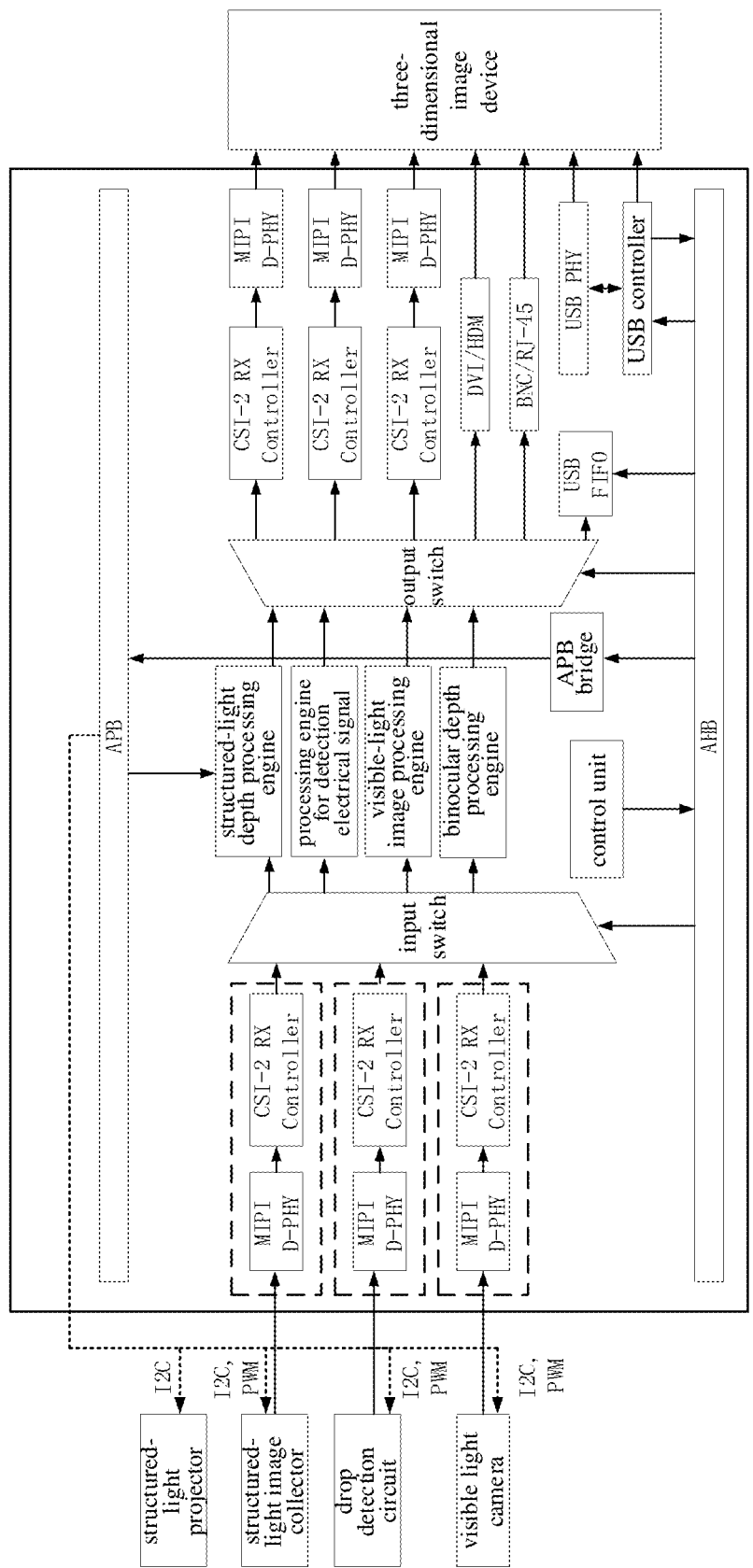
FIG. 11 is a block diagram illustrating details of the depth processor in FIG. 2.
Figure 12:
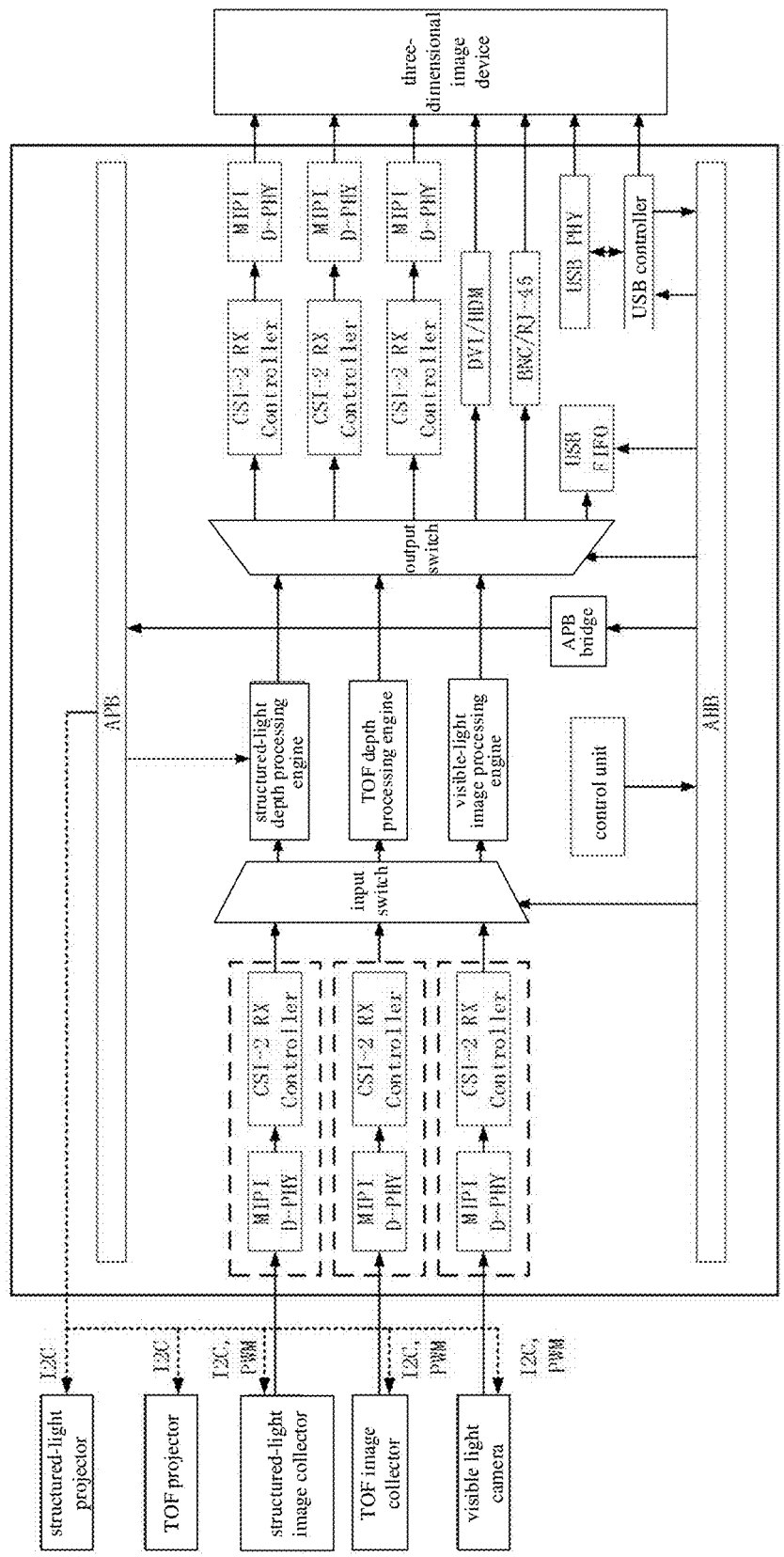
FIG. 12 is a block diagram illustrating details of the depth processor in FIG. 3.

FIG. 10-FIG. 12 are schematic diagrams illustrating examples detailed structures of the depth processor 100. In the depth processor 100, each functional element may be disposed on a semiconductor substrate, and the functional elements may be coupled to each other by wiring. The depth processor 100 is externally coupled through a plurality of pins, and the plurality of pins are set into different port types based on functions. For example, the input port 10 and the output port 50 may use a type of interface such as SVP, MIPI (Mobile Industry Processor Interface), USB (Universal Serial Bus), DVI (Digital Display Working Group), HDMI (High Definition Multimedia Interface), BNC (Bayonet Nut Connector) and RJ-45 (Registered Jack 45). Transmission of other types of interfaces may not be described here.

Taking FIG. 1 and FIG. 10 as an example, the depth processor 100 is disposed with four input ports 10, all of which are MIPI interfaces. In another implementation, the ports may also be DVP interfaces, which may be respectively coupled to the structured-light image collector 212, the drop detection circuit 220, the visible light camera 230 and the TOF image collector 252. Each input port 10 receives a first image or detects an electrical signal from a peripheral device coupled to the input port 10. The MIPI interface consists of a MIPI D-PHY physical layer interface and a second generation camera high-speed serial interface (CSI-2). A definition of data transmission in a physical layer is given in the D-PHY. A structure of the CSI-2 is generally composed of a group/unpack layer, a protocol layer and a channel management layer. The CSI-2 may be divided into a CSI-2 RX receiver and a CSI-2 TX transmitter based on a transmission route of data among the three layers. In the input port 10, the CSI-2 RX receiver receives the first image or detects the electrical signal, and in the output port 50, the CSI-2 TX transmitter transmits the second image or the determination result to the main device.

The input switch 20 is coupled between a MIPI input interface and the data processing engine 30. A function of the input switch 20 is to selectively pass data of the MIPI input interface for different application situations. In addition, the passed data is transmitted to the data processing engine 30.

Each engine in the data processing engines 30 is coupled to the output switch 40, and then coupled to the output port 50 through the output switch 40. After the output switch 40 is coupled to each engine, the output switch 40 may selectively receive the second image or a detection electrical signal from the data processing engine 30 based on a current application. The second image and the detection electrical signal may also be outputted to the outside through a MIPI output interface. In detail, the second image and the detection electrical signal may be outputted through a CSI-2 TX controller and the MIPI D-PHY. There may be one or more MIPI output interfaces including the CSI-2 TX controller and the MIPI D-PHY.

The second image outputted by each processing engine in the data processing engine 30 may be transmitted to a USB FIFO. The USB FIFO (First Input First Output) may perform data buffering, and simultaneously package and transmit all kinds of data to the USB interface via an AHB bus and output data packets to a three-dimensional image device 200. The USB interface includes a USB controller and a USB PHY interface. When the data in the USB FIFO is ready, the USB controller accesses the AHB bus to read the prepared data packet.

Detailed architectures of the depth processor 100 illustrated in FIG. 11 and FIG. 12 are similar to the detailed architecture of the depth processor 100 illustrated in FIG. 10, which may not be elaborated herein.

Figure 13:
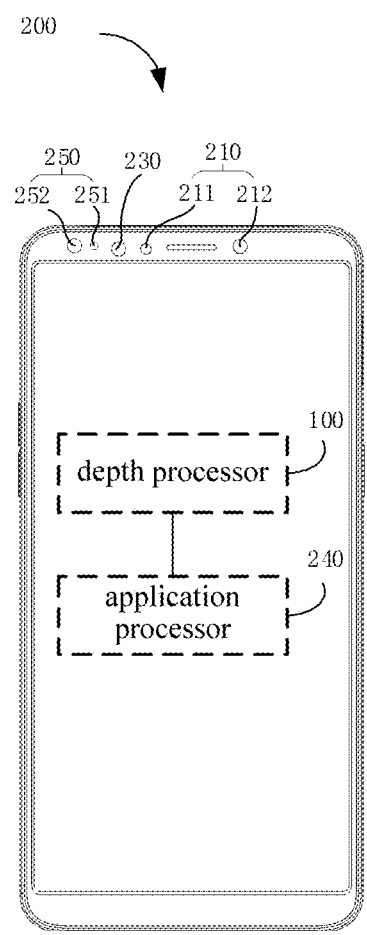
FIG. 13 is a block diagram illustrating a three-dimensional image device according to some implementations of the present disclosure.

Please refer to FIG. 13, the present disclosure also provides a three-dimensional image device 200. The three-dimensional image device 200 includes the depth processor 100 and the structured-light depth camera 210 according to any one of the above implementations.

In some implementations, the three-dimensional image device 200 also includes a drop detection circuit 220.

In some implementations, the three-dimensional image device 200 also includes a TOF depth camera 250.

In some implementations, the three-dimensional image device 200 also the drop detection circuit 220 and the TOF depth camera 250.

The three-dimensional device may be the above main device, such as, a mobile phone, a tablet, a notebook, a wearable device (such as a smart watch, a smart bracelet, smart glasses, a smart helmet, etc.), and a virtual reality device.

The three-dimensional image device 200 also includes an application processor 240. The application processor 240 is coupled to an output port 50 of the depth processor 100. The application processor 240 may be configured to perform at least one of three-dimensional reconstruction, human posture and motion recognition and article recognition by utilizing a depth image.

For example, the application processor 240 obtains a structured-light depth image and a visible light image from the depth processor 100, establishes a three-dimensional model of a target space based on the structured-light depth image, and fills the three-dimensional model with color based on the visible light image, to obtain a colored three-dimensional model of the target space.

For another example, the application processor 240 obtains a binocular depth image and a visible light image from the depth processor 100, firstly recognizes a human face based on the visible light image, and then recognizes a whole human body in the visible light image in combination with depth information carried by the binocular depth image, such that recognition for the human body is more accurately.

For another example, the application processor 240 obtains a TOF image and a visible light image from the depth processor 100. First, the visible light image is processed by an edge detection algorithm to obtain an edge line of each object in the visible light image, and then the edge line of each object is corrected in combination with depth information carried by the TOF depth image to extract each object in the visible light image. Finally, a detailed type of each object is recognized by utilizing a trained deep learning model for object recognition.

With the depth processor 100 and the three-dimensional image device 200 according to implementations of the present disclosure, the drop detection circuit 220 is, as the peripheral device, coupled to the depth processor 100. In this way, the depth processor 100 may not only process the structured-light image, but also perform the drop-preventing detection judgment, and the depth processor 100 has higher integration and more perfect functions.

With the depth processor 100 and the three-dimensional image device 200 according to implementations of the present disclosure, the depth processor 100 may be coupled to a plurality of types of peripheral devices, and process the input data of the plurality of peripheral devices, which may have high integration and universality, and be applicable to a plurality of different types of three-dimensional image devices 200 and various application scenes.

In the description of the present disclosure, reference throughout this specification to "an embodiment," "some embodiments," "an example," "a specific example," or "some examples," means that a particular feature, structure, material or feature described in connection with the embodiment or example is included in at least one embodiment or example of the present disclosure. The appearances of the above phrases throughout this specification are not necessarily referring to the same embodiment or example. Furthermore, without contradicting each other, the skilled in the art may combine different embodiments or examples described in this specification and features of different embodiments or examples.

In addition, the terms "first" and "second" are only for description purpose, and cannot be understood as indicating or implying relative importance or implicitly indicating the number of indicated technical features. Therefore, the features defined with "first" and "second" can include at least one of the features explicitly or implicitly. In addition, in the description of the present disclosure, the term "a plurality of" means two or more, such as two and three, unless specified otherwise.

Any procedure or method described in a flow chart or described herein in other ways may be understood to include one or more modules, segments or portions of codes of executable instructions for achieving specific logical functions or steps in the procedure, and the scope of a preferred embodiment of the present disclosure includes other implementations. The order of execution is different from that which is depicted or discussed, including executing functions in a substantially simultaneous manner or in an opposite order according to the related functions, which should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More detailed examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above embodiment method may be achieved by commanding the related hardware with a program. The program may be stored in a computer readable storage medium, and the program includes one or a combination of the steps in the method embodiments when operated on a computer.

In addition, each function unit of each embodiment of the present disclosure may be integrated in a processing module, or these units may be separate physical existence, or two or more units are integrated in a processing module. The integrated module may be realized in a form of hardware or in a form of software function modules. When the integrated module is realized in the form of software function module and is sold or used as a standalone product, the integrated module may be stored in a computer readable storage medium.

The storage medium mentioned above may be a read-only memory, a magnetic disk or CD, etc. Although embodiments of the present disclosure have been shown and described above, it should be understood that the above embodiments are examples and should not be construed as limiting the present disclosure. The skilled in the art can make changes, modifications, substitutions and variations to the above embodiments within the scope of the present disclosure.

What is claimed is:

1. A three-dimensional image device, comprising:
a depth processor;
a structured-light depth camera, comprising a structured-light projector and a structured-light image collector, wherein the structured-light image collector is configured to collect a structured-light image in a target space projected by the structured-light projector; and
a time of flight (TOF) depth camera, comprising a TOF projector and a TOF image collector, wherein the TOF image collector is configured to receive an infrared light projected to a target space by the TOF projector and reflected by an object in the target space; wherein, the depth processor comprises:
at least two input ports configured to receive first images, the at least two input ports comprising a first input port and a second input port, the first input port being coupled to the structured-light depth camera, and the second input port being coupled to the TOF depth camera;
an input switch coupled to the at least two input ports; and
a data processing engine coupled to the input switch.

2. The three-dimensional image device of claim 1, wherein
the input switch is configured to output a part or all of the first images received by the at least two input ports; and
the data processing engine is configured to process the first images outputted by the input switch to output second images, the second images comprising a depth image.

3. The three-dimensional image device of claim 2, wherein the depth processor further comprises:
at least one output port, coupled to the data processing engine and configured to output a part or all of the second images to a main device.

4. The three-dimensional image device of claim 3, wherein the depth processor further comprises an output switch coupled between the data processing engine and the at least one output port, and the output switch is configured to output the part or all of the second images to the at least one output port.

5. The three-dimensional image device of claim 4, wherein the depth processor further comprises a first bus device and a second bus device, the first bus device is configured to control a peripheral device coupled to the depth processor and is coupled to the second bus device via a bridge, the second bus device is coupled to a control unit, and the control unit is configured to manage an interface of the input switch, an interface of the output switch and an interface of the peripheral device via the second bus device, wherein the peripheral device comprises at least one of the structured-light depth camera, or the TOF depth camera.

6. The three-dimensional image device of claim 5, wherein the first bus device is further configured to control the peripheral device to be turned on based on a type of a depth image required by the main device.

7. The three-dimensional image device of claim 1, wherein the structured-light depth camera is configured as a front device, the TOF depth camera is configured as a rear device, and the structured-light depth camera and the TOF depth camera are switched in response to a switching instruction, and
the first images comprise a structured-light image collected by the structured-light depth camera, and a TOF depth image collected by the TOF depth camera.

8. The three-dimensional image device of claim 7, further comprising:
a visible light camera coupled to a third input port of the at least two input ports and configured to collect a visible light image; wherein,
the first images further comprise a visible light image collected by the visible light camera, the data processing engine further comprises a visible-light image processing engine, and the visible-light image processing engine is configured to process the visible light image to recognize an object of which a capturing area is smaller than a preset area in the visible light image.

9. The three-dimensional image device of claim 8, wherein the data processing engine further comprises a correction engine, the correction engine is configured to correct depth information of a pixel corresponding to the object in the structured-light depth image by utilizing the TOF depth image.

10. The three-dimensional image device of claim 1, wherein the first images comprises at least one of a structured-light image collected by the structured-light depth camera or a TOF image collected by a TOF depth camera, and the depth image comprises at least one of a structured-light depth image or a TOF depth image.

11. The three-dimensional image device of claim 10, wherein the data processing engine comprises a structured-light depth processing engine, and the structured-light depth processing engine is configured to calculate the structured-light depth image based on a reference image and the structured-light image.

12. The three-dimensional image device of claim 10, wherein the data processing engine comprises a TOF depth processing engine, and the TOF depth processing engine is configured to calculate the TOF depth image based on the TOF image.

13. The three-dimensional image device of claim 1, wherein the at least two input ports further comprises a third input port, and the three-dimensional image device further comprises:
  a drop detection circuit coupled to the third input port of the at least two input ports and configured to output a detection electrical signal; wherein,
  the third input port is configured to receive the detection electrical signal outputted by the drop detection circuit;
  the input switch is further configured to output the detection electrical signal to the data processing engine; and
  the data processing engine is further configured to determine, based on the detection electrical signal, whether a protective cover of the structured-light depth camera drops.

14. The three-dimensional image device of claim 13, wherein the depth processor further comprises:
  at least one output port, coupled to the data processing engine and configured to output a determination result to a main device.

15. The three-dimensional image device of claim 14, wherein the depth processor further comprises an output switch coupled between the data processing engine and the at least one output port, and the output switch is configured to output the determination result to the at least one output port.

16. The three-dimensional image device of claim 13, wherein the structured-light projector is controlled to be turned off by the main device in a case that the protective cover drops.

17. The three-dimensional image device of claim 13, wherein the data processing engine comprises a processing engine for the detection electrical signal, the processing engine for the detection electrical signal is configured to determine whether the detection electrical signal is within a preset range, and to determine that the protective cover drops in a case that the detection electrical signal is not within the preset range.

18. The three-dimensional image device of claim 13, wherein the structured-light projector comprises a lens barrel and the protective cover, the drop detection circuit comprises a first electrode plate and a second electrode plate, the first electrode plate is disposed on the lens barrel, the second electrode plate is disposed on the protective cover and opposite to the first electrode plate at intervals, and the second electrode plate and the first electrode plate form a detection capacitor.

19. The three-dimensional image device of claim 13, wherein the structured-light projector comprises a lens barrel and the protective cover, the drop detection circuit comprises a pressure sensor and a connection circuit, the pressure sensor is disposed between the lens barrel and the protective cover and is subjected to pressure, and the pressure sensor is coupled to the connection circuit to form a detection loop.

20. The three-dimensional image device of claim 13, wherein the structured-light projector comprises a substrate assembly, a lens barrel disposed on the substrate assembly, and the protective cover, the protective cover comprises a protective top wall and a protective side wall extending from a periphery of the protective top wall, the drop detection circuit comprises a transmitter and a receiver, at least one of the transmitter and the receiver is disposed on the protective side wall and the other is disposed on the substrate assembly, and the transmitter and the receiver are oppositely disposed to form the drop detection circuit.

* * * * *